United States Patent [19]

Burford

[11] 4,095,520
[45] Jun. 20, 1978

[54] HORIZONTAL BALER

[76] Inventor: Charles E. Burford, 3131 Turtle Creek Blvd., Dallas, Tex. 75219

[21] Appl. No.: 724,275

[22] Filed: Sep. 20, 1976

[51] Int. Cl.² .................. B30B 15/26; B65B 13/18
[52] U.S. Cl. ........................................ 100/43; 100/4
[58] Field of Search ............... 100/3, 4, 43, 191, 192, 100/17, 18, 19, 20, 21, 22, 23

[56] References Cited

U.S. PATENT DOCUMENTS

| 3,587,448 | 6/1971 | Hemphill | 100/3 |
| 3,851,575 | 12/1974 | Cardoza | 100/4 |

Primary Examiner—Billy J. Wilhite
Attorney, Agent, or Firm—Gerald G. Crutsinger; Larry B. Dwight

[57] ABSTRACT

A horizontal baler comprising a compactor chamber with a compaction end and a discharge end. A bale of material is formed in the compaction end of the chamber as loose material is deposited in the chamber and compressed by a plunger which is reciprocally driven in the chamber by a motor. A first bale is formed in the chamber and tied with wire. The first bale is urged toward the discharge end of the chamber by compression of more material in the chamber to form a second bale. The end of the first bale forms an end wall in the chamber against which loose material is compressed to form another bale. The improvement comprises a plate which is urged into frictional contact with the first bale when the first bale is adjacent the discharge end of the chamber to limit further movement of the first bale in the chamber. More material is compressed by the plunger into the second bale until the density of the second bale has reached a predetermined amount. The bale is automatically tied and the plate disengaged from the first bale to allow the first bale to be discharged from the baler. The second bale is moved toward the discharge end of the chamber.

10 Claims, 3 Drawing Figures

HORIZONTAL BALER

BACKGROUND OF THE INVENTION

Heretofore, material such as hay, paper, metal and similar materials have been baled in devices of the type described in U.S. Pat. No. 3,202,087, issued Aug. 24, 1965, entitled "Method and Apparatus for Tying Bales" which is incorporated herein by reference in its entirety.

Balers of this type have a chute or chamber through which the bale is moved and compressed for tying. The chamber has a compaction end in which loose material is deposited and compressed by a plunger which is reciprocally driven by a crankshaft connected to a motor or a hydraulic ram. The chamber generally has a discharge end which is adjustable to reduce the cross-sectional area of the chamber such that the bale being pushed out of the chamber frictionally engages the inside walls of the chamber. The force required to move the bale out of the chamber is a function of the frictional forces between the bale and the chamber. The frictional forces are increased by decreasing the cross-sectional area of the chamber requiring a greater force to discharge the bale from the chamber.

Usually, a first bale is formed and tied in the chamber and is moved toward the discharge end of the chamber by compression of more loose material in the chamber by the plunger to form the second bale. The first bale forms an end wall in the chamber against which to compress the material of the second bale. In order to form a high density bale, greater forces must be used to compress material into the bale by the plunger. To increase the forces required for greater density, it is necessary to increase the force required to discharge the first bale from the chamber.

However, as the frictional forces to hold the first bale in the chamber are increased, the force exerted by the second bale on the sides of the chamber is increased. The baling wire is dispensed and drawn around the bale as the material is forced into the chamber. Increased density increases the forces that the second bale exerts on the walls of the chamber thereby increasing the frictional force of the wire along the sides of the chamber. These frictional forces of the wire against the sides of the chamber tend to hold the wire against the sides of the chamber. At the same time the bale is being formed to its full size, the wire is being drawn around the bale by compression of the material in the chamber. Thus, the wire is stretched or pulled in a longitudinal direction in the chamber. The combined frictional forces and longitudinal forces on the wire will break the wire if a bale of high density is formed which would cause these forces to exceed the tensile strength of the wire. Consequently, the only correction to prevent damage to the wire is to increase the cross-sectional area of the discharge end of the chamber thereby decreasing the density of the bale.

The invention is addressed to producing an improved discharge end of the chamber to enable production of high density bales without excessive forces on the wire as the wire is formed around the bale.

SUMMARY OF THE INVENTION

I have devised an improved discharge end of a chamber in a conventional baler comprising a pressure plate which is automatically urged into frictional engagement with a first bale adjacent the discharge end of the chamber. When the second bale has been completed and tied, the plate is released from frictional engagement with the first bale such that it may be urged from the discharge end of the chamber without creating excessive frictional forces on the wire being extended about the material in the next bale to be formed.

The device comprises a conventional baler having a chamber with a compaction end, a discharge end, and a plunger reciprocally driven by a motor to compress loose material into the chamber. A plurality of wire strands are spaced across the chamber such that material forced into the chamber is urged against the wire such that a portion of a loop is formed about the bale while the material is being compressed in the chamber and urged toward the discharge end of the chamber.

A first bale is completed, tied, and urged toward the discharge end of the chamber by compression of more material to form a second bale. The chamber is approximately two and a half times the length of a bale such that as the first bale is adjacent the discharge end of the chamber the second bale is formed to full length.

When the second bale has reached the discharge end of the chamber, a pressure plate is urged into frictional engagement with the side of the first bale to limit further movement of the first bale in the chamber. Compression of material in the chamber is continued until the predetermined density of the second bale is reached at which time the bale is tied.

Apparatus to urge the pressure plate into frictional engagement with the bale comprises rollers rotatably secured to a first end of a first lever arm. The second end of the first lever arm is rigidly secured to a sleeve. The sleeve is pivotally secured to the frame work of the baler such that rotation of the sleeve urges the rollers on the first end of the first lever arm into rolling engagement with the pressure plate. A hydraulic cylinder is secured to a crank having a first end rigidly secured to the sleeve. The cylinder is adapted to move the crank to rotate the sleeve, and urge the rollers into rolling contact with the pressure plate to urge the pressure plate into frictional engagement with the bale.

A primary object of the invention is to provide an improved discharge end of a chamber in a bale forming apparatus to produce high density bales without breaking the wire as the wire is dispensed about the bale being formed in the compactor chamber.

Another object of the invention is to provide apparatus for automatically retaining a completed first bale adjacent the discharge end of the chamber to provide an end wall against which more material is compressed by a plunger to form a second bale releasing the first bale when the second bale is completed.

Another object of the invention is to provide an apparatus which is particularly adapted for installation on existing bale forming apparatus to enable production of high density bales without breaking the tying wire.

Other and further objects of the invention will become apparent upon referring to the detailed description hereinafter following and by referring to the drawings annexed hereto.

DESCRIPTION OF THE DRAWINGS

Drawings of a preferred embodiment of the invention are annexed hereto so that the invention may be better and more fully understood in which.

Numeral references are employed to designate parts shown in the drawings and like numerals designate like parts throughout the various figures of the drawings.

DESCRIPTION OF A PREFERRED EMBODIMENT

Figure 1:
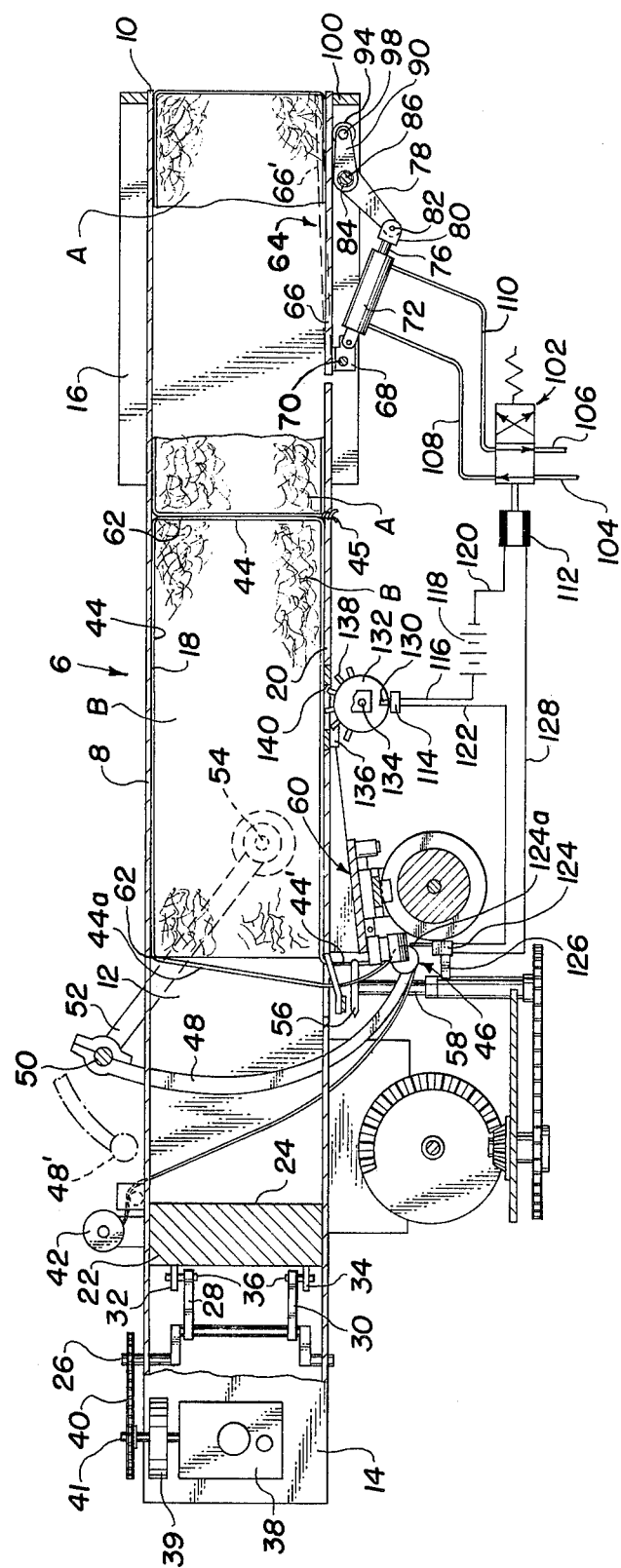
FIG. 1 is a partially sectionalized plan view of the bale forming apparatus.
Figure 2:
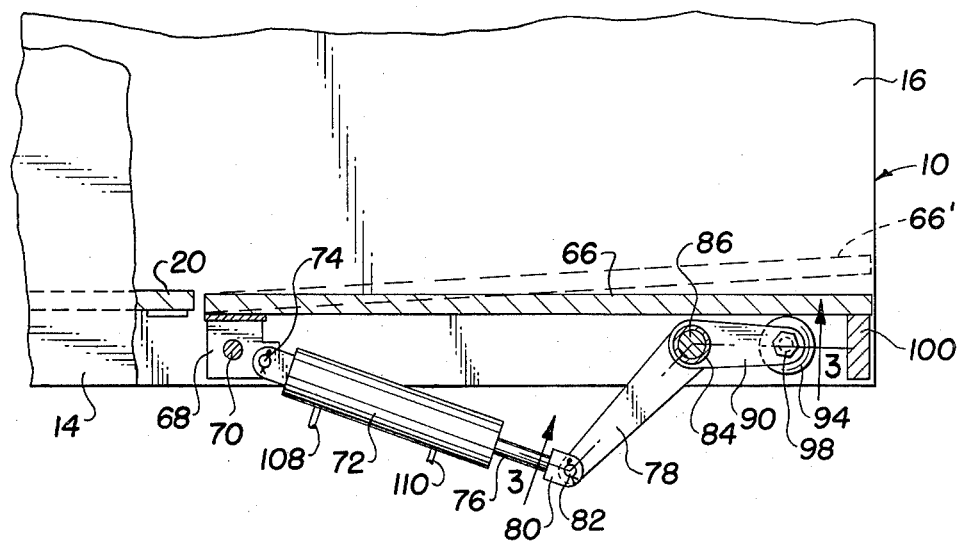
FIG. 2 is an enlarged fragmentary plan view of the discharge end of the bale forming apparatus.
Figure 3:
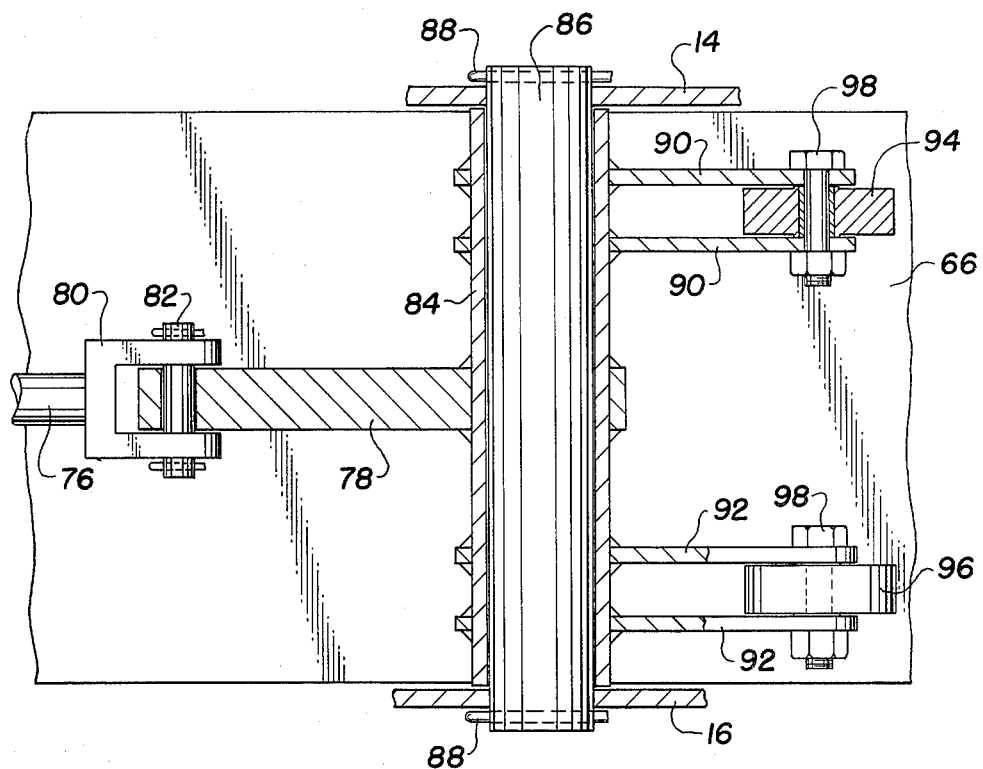
FIG. 3 is a cross-sectional view taken along line 3—3 of FIG. 2.

The numeral 6 generally designates a bale forming apparatus comprising a compactor chamber 8 having a discharge end 10 and a compaction end 12.

The chamber 8 comprises a top 14 and a bottom 16 spaced apart by sides 18 and 20 forming a generally rectangular cross-section. The chamber 8 is preferably approximately two and a half times the length of the bale such that as one bale is adjacent the discharge end 10 of the chamber 8 another bale is approximately full length.

The bale of material is formed as loose material is deposited into the compaction end 12 of chamber 8. Suitable means such as plunger 22, best illustrated in FIG. 1, is employed for compressing the loose material delivered into the compaction end 12 to form a bale. The plunger 22 preferably comprises a generally rectangular block having slots 24 formed therein to allow passage of the needles 48 on the tying mechanism 46 as more fully explained hereinafter. The plunger 22 is reciprocally driven in the compaction end 12 of chamber 8 by means of a crankshaft 26 journalled through the sides 18 and 20 of chamber 8. Crankshaft 26 is connected to plunger 22 by means of rods 28 and 30 pivotally secured to lugs 32 and 34 by pins 36. The lugs 32 and 34 are rigidly secured to plunger 22 by welding or the like. A motor 38 is secured to clutch 38 which is secured to the chankshaft 28 by chain 40. Motor 38 and chain 40 rotate crankshaft 26 to reciprocate plunger 22 in the chamber 8. Clutch 39 is adapted to disengage crankshaft 26 from motor 40. Motor 38 may be a typical internal combustion engine typically used on balers or another type of motor such as hydraulic, air or electric.

A plurality of wire spools 42 are spaced vertically adjacent the compaction end 12 of chamber 8 by brackets or the like. Wires 44 from spools 42 are dispensed across chamber 8. Loose material forced into the chamber 8 is urged againt wires 44 such that a loop is formed about three sides of the bale as the material is compressed into the chamber 8 by plunger 22. As the wire 44 is dispensed, one end 44' of the wire 44 is held by the gripping and twisting mechanism 46 as will be more fully explained hereinafter.

The tyer mechanism comprises arcuate shaped needles 48 which are carried by bar 50 mounted on the end of arm 52 pivotally secured about shaft 54. The needles 48 oscillate from the position 48' shown in full outline for feeding an intermediate portion 44a of wire 44 to the wire gripping and twisting mechanism 46.

The wire gripping and twisting mechanism 46 comprises a twister hook 56 secured to the end of shaft 58 as more fully described in U.S. Pat. No. 3,202,087 issued to Burford, entitled "Method and Apparatus for Tying Bales" which description is incorporated herein by reference in its entirety. End 44' of wire 44 is retained by wire gripper 60 and material is compressed by plunger 22 against the wire 44 about the bale.

When the bale is of full length and completed, the needles 48 are moved across the chamber 8 through slots 24 in plunger 22, thus moving an intermediate portion 44a of wire 44 across the end 62 of the bale. The wire 44 is gripped by gripper 60 and twister hooks 56 are rotated tying ends 44' and 44a together and positioning a new end 44' of wire 44 in gripper assembly 60 for formation of another bale.

Bale retention means 64 comprises a generally rectangular shaped pressure member 66 positioned adjacent the discharge end 10 of chamber 8. Plate or member 66 is pivotally secured at one end to side 20 of chamber 8. Means to moveably secure plate 66 to the chamber 8 comprises lugs 68 rigidly secured by welding or the like to plate 66. Lugs 68 are rigidly secured to shaft 70 which is journalled through the top 14 and bottom 16 of chamber 8 and secured by a cotter pin or the like.

The plate 66 is adapted to be urged into frictional engagement with a side of a bale as the bale moves to a position adjacent the discharge end 10 of chamber 8. As plate 66 moves into frictional engagement with the bale, the plate 66 limits further movement of the bale within the chamber 8.

Means to urge plate 66 into frictional engagement with the bale comprises a hydraulic cylinder 72 having a base end pivotally secured by a pin 74 to one of lugs 68. A piston rod 76 extends outwardly from hydraulic cylinder 72 and is pivotally secured to one end of crank 78 by clevis 80 and pin 82. The other end of crank 78 is rigidly secured to a sleeve 84 by welding or the like. Sleeve 84 is rotatably secured about shaft 86 journalled through the top 14 and bottom 16 of chamber 18 and secured thereto by cotter pin 88. The shaft 86 preferably is positioned in a plane parallel and adjacent to plate 66.

Sleeve 84 has lever arms 90 and 92 rigidly secured thereto by welding or the like and extending outwardly therefrom. Rollers 94 and 96 are rotatably secured to the outward end of level arms 90 and 92 by bolts 98 journalled through a passage in the outward end of lever arms 90 and 92. The rollers 94 and 96 are adapted to move into rolling contact with plate 66 to urge plage 66 into frictional engagement with the bale adjacent discharge end 10 of chamber 8.

Crank 78 is preferably one and a half to two times longer than lever arms 90 and 92 to increase the mechanical advantage of hydraulic cylinder 72. Rollers 94 and 96 are positioned on lever arms 90 and 92 to prevent frictional wear of plate 66 as lever arms 90 and 92 are moved to urge rollers 94 and 96 against plate 66, urging the plate into frictional engagement with the bale adjacent end 10 of chamber 8.

As best illustrated in FIG. 1, plate 66 is moveable between a position shown in solid outline, substantially parallel to wall 20 of chamber 8, to a position 66' shown in dashed outline in frictional engagement with the bale adjacent discharge end 10. It should be readily apparent that other leverage arrangements may be devised to urge plate 66 into engagement with the bale.

A reinforcement member 100 is provided adjacent discharge end 10 to reinforce the sides of chamber 8 and prevent further outward movement of plate 66 from a position substantially parallel to wall 20.

Actuating means to actuate hydraulic cylinder 72 comprises a four-way, two-position spring biased valve 102. A source of pressurized fluid (not shown) is connected to the inlet of valve 102 by conduit 104. A vent conduit 106 vented in the reservoir (not shown) is connected to the outlet of valve 102.

Valve 102 is illustrated in an energized position wherein pressurized fluid 104 flows into conduit 108 connected to the base side of cylinder 72. Piston rod 76 is exended outwardly, rotating lever arm 78 and 90 to urge rollers 94 and 96 into engagement with plate 66. Conduit 110 is connected to the upper end of hydraulic cylinder 72 to vent fluid into vent conduit 106.

When valve 102 is de-energized, pressure is delivered from conduit 104 to conduit 110 to retract piston rod 76 and vent conduit 108 through conduit 106.

Actuating means to energize valve 102 comprises a solenoid 112 connected to valve 102 to move valve 102 to the energized position as illustrated. Solenoid 112 is energized by a magnetically actuated switch 114 such as a single-pole, single-throw compact magnetic reed switch. Switch 114 has one side connected by line 116 to a power source 118 such as a battery or other similar source. The other pole of power source 118 is connected by line 120 to one side of solenoid 112. The other side of switch 114 is connected by line 122 to a time delay closing, normally closed, single-pole, single-throw switch 124 secured by a bracket 126 to the twister assembly 46. The other side of switch 124 is connected by a line 128 to the other side of solenoid 112.

Magnetic actuated switch 114 is energized by a magnet 130 positioned on a wheel 132. Wheel 132 is rotatably secured to shaft 134 journalled through support bracket 136 rigidly secured to the side 20 of chamber 8. Wheel 132 has lugs 138 thereon which pass through passage 140 formed in side 20 of chamber 8 and engage the surface of the side of a bale such that movement of the bale moves lugs 138 rotating wheel 132. The length of the circumference of wheel 132 is equal to the length of a finished bale of material. The wheel 132 is adapted to rotate one turn each time a full length of the bale passes the wheel 132. Simultaneously the switch 114 is closed when a bale is adjacent the discharge end 10 of chamber 8 since magnet 130 is aligned with switch 114. The magnet 130 closes the normally open magnetic actuated switch 114, making a circuit through normally closed switch 124 to solenoid 112. Valve 102 is moved to the energized position by solenoid 112, actuating hydraulic cylinders 72 to rotate crank 78 and lever arms 90 and 92 to urge rollers 94 and 96 into rolling contact with plate 66.

Needles 48 engage lever 124a on the time delay, closing normally closed switch 124, moving the switch to the open position to break the circuit to solenoid 112. A spring urges valve 102 to the de-energized position. Switch 124 is time delayed in closing, therefore, a predetermined amount of time must pass before switch 124 closes again. During this time plunger 22 is re-engaged by engaging clutch 39, urging the bale toward the discharge end 10 of chamber 8 and rotating wheel 132 a sufficient amount to disalign magnet 130 with switch 114 such that solenoid 112 cannot be energized until another bale has reached the discharge end 10 of chamber 8.

Operation of the hereinbefore described invention is as follows:

Loose material is deposited in the compaction end 12 of baler 6. Plunger 22 urges the material toward discharge end 10 Wire 44, anchored at end 44' in gripper assembly 60 is dispensed around the bale material on three sides as the material moves through the chamber. When a completed bale is finished, the tyer mechanism 46 is energized automatically as described in U.S. Pat. No. 3,202,087. Needle 48 moves across chamber 8 and twister 56 is rotated to form a knot 45 in the wire 44. This process completes the first bale A. The first bale A forms an end wall 62 across the chamber 8 against which more material is compacted to form the next bale B. Movement of bale A toward discharge end 10 rotates wheel 132 by movement of lugs 138 such that as bale A reaches the discharge end 10 of chamber 8 magnet 130 on wheel 132 is aligned with magnetically actuated switch 114.

As loose material is compacted by plunger 22 in chamber 8, the wire 44 is dispensed about the second bale B being formed on three sides of the bale. When magnet 130 is aligned with magnetically actuated switch 114 bale B is approximately the full length of a completed bale.

When magnet 130 is aligned with magnetically actuated switch 114, this energizes relay 112 by a circuit hereinbefore discussed, moving valve 102 to be energized position. Pressurized fluid is then delivered from conduit 104 to conduit 108 extending piston rod 76. Piston rod 76 moves crank 78, rotating sleeve 84 about shaft 86. Rotation of sleeve 84 moves lever arms 90 and 92 to urge rollers 94 and 96 into rolling contact with pressure plate 66. As rollers 90 and 92 are rolled into contact with plate 66, plate 66 is urged to the position 66' shown in dashed outline (FIG. 1) in frictional engagement with bale A.

A further movement of bale A is limited by the frictional engagement of plate 66, the end wall 62 formed by bale A limits further movement of bale B within chamber 8.

Plunger 22 continues to pack material into chamber 8 increasing the density of bale B. However, it should be noted that wire 44 is already formed about three sides of bale B and no longer requires any further movement so that the forces of the compressed material outwardly on the sides of chamber 8 do not create a frictional force and longitudinal drag on wire 44 against the sides 18 and 20 of chamber 8.

Loose material is continued to be compacted in bale B until the desired density has been reached; whereupon, plunger 22 is stopped in the forward position against end 62 of bale B by disengaging clutch 39. Needles 48 are moved through slots 24 in plunger 22 to engage wire 44 and move the wire across the chamber 8. As the wire 44 reaches the gripper mechanism 60, both ends 44' and 44a are gripped. Twister 56 is rotated tying a knot 45 in wire 44 to tie the bale.

The end of needle 48 engages lever 124a of switch 124, which breaks the circuit to solenoid 112 and de-energizes valve 102. Valve 102 is spring-urged to the de-energized position, allowing flow of pressurized fluid from conduit 104 to conduit 110 to retract rod 76. Rod 76 moves crank 78 in a clockwise direction. Movement of crank 78 rotates sleeve 84 to move lever arms 90 and 92 and rollers 94 and 96 out of engagement with plate 66. The disengagement of rollers 94 and 96 with plate 66 relieves the force of plate 66 against bale A reducing the frictional forces therebetween.

Needles 48 are withdrawn from slots 24 and clutch 39 is re-engaged. Plunger 22 is moved to compress loose material against the end 62 of bale B. As bale B is moved through chamber 8; wheel 132 is rotated disaligning magnet 130 with magnetially actuated switch 114. Time delay closing switch 124 will close again after a predetermined time and magnet 130 has moved out of alignment with magnetially actuated switch 114.

Bale A is urged from the discharge end 10 of chamber 8 and bale B is urged toward the discharge end 10. It should be readily apparent from the foregoing that upon bale B reaching the discharge end 10 of chamber 8, wheel 132 has rotated a complete turn aligning magnet 130 with magnetically actuated switch 114 to energize relay 112 and move valve 102 to be energized position. This again energizes hydraulic cylinder 72 to urge rollers 94 and 96 into rolling contact with plate 66 to urge plate into frictional engagement with bale B to retain bale B in the discharge end of chamber 8.

It should be appreciated that the embodiment hereinbefore described accomplishes the objects of the invention hereinbefore discussed.

It should be further appreciated that other and further embodiments of the invention may be devised without departing from the basic concept thereof.

Having described my invention; I claim:

1. In a baling apparatus having a chamber and a discharge end of the chamber: a pressure member; means moveably securing said pressure member adjacent one side of the discharge end of the chamber; pressure actuated means to urge said pressure member into frictional engagement with the side of a bale adjacent said discharge end of the chamber; a sleeve; means pivotally securing the sleeve for rotation about an axis lying adjacent the pressure member; a crank arm rigidly secured to the sleeve; means securing the pressure actuated means to the crank arm; a lever arm; means securing the lever arm to the sleeve; roller means rotatably secured to the end of said lever arm and adapted to rollingly engage said pressure member, said roller means being arranged to urge the pressure member into frictional engagement with a bale in said chamber; a source of pressurized fluid; and valve means between said source of pressurized fluid and said pressure actuated means.

2. Apparatus to bale loose material comprising: a chamber having an inlet end and a discharge end; means to compress loose material in the inlet end of said chamber against the rear end of a previously tied bale slideably disposed in said chamber. control means associated with said chamber and adapted to deliver a signal upon movement of a bale to a predetermined position in said chamber; a pressure member; means moveably securing said pressure member adjacent said discharge end of said chamber; actuated means to urge the pressure member into frictional engagement with the side of the previously tied bale; actuating means between said control means and said actuated means, said actuating means being adapted to receive signals from said control means and actuate said actuating means after the previously tied bale has moved to a position wherein the volume of the chamber between the inlet end of the chamber and the rear end of the previously tied bale is substantially equal to the volume of the previously tied bale; and means to reduce force urging the pressure member into frictional engagement with the side of the previously tied bale to reduce frictional force between the previously tied bale and the pressure member to minimize friction force exerted on wire against which loose material is compacted to form a bale of predetermined volume.

3. Apparatus according to claim 2, said control means comprising: means in rolling engagement with a bale in said chamber; and a switch in an electrical circuit, said means in rolling engagement with a bale being adapted to actuate said switch to deliver an electrical signal to said actuating means.

4. Apparatus according to claim 3, said actuating means further comprising: a solenoid actuated valve, said solenoid actuated valve being connected to said switch in the electrical circuit.

5. Apparatus according to claim 4, said actuated means comprising: a pressure actuated hydraulic cylinder having a piston rod extendable from one end thereof; means connecting said solenoid actuated valve to said pressure actuated cylinder; and means secured to said piston rod to urge the pressure member into frictional engagement with a bale in said chamber.

6. Apparatus to bale loose material comprising: a chamber having an inlet end and a discharge end; means to compress loose material in the inlet end of said chamber against the rear end of a previously tied bale slideably disposed in said chamber; a pressure member; means moveably securing said pressure member adjacent said discharge end of said chamber; a pressure actuated cylinder having an extendable piston rod extending therefrom to urge the pressure member into frictional engagement with the side of the previously tied bale after the previously tied bale has moved to a position wherein the volume of the chamber between the inlet end of the chamber and the rear end of the previously tied bale is substantially equal to the volume of the previously tied bale; means securing one end of said pressure actuated cylinder to the chamber; a sleeve; means pivotally securing the sleeve for rotation about an axis lying in a plane parallel to and adjacent to the pressure member; a crank arm rigidly secured to the sleeve; means securing the piston rod to the crank arm; a lever arm; means securing the lever arm to the sleeve; roller means rotatably secured to the end of said lever arm and adapted to rollingly engage said pressure member, said roller means being arranged to urge the pressure member into frictional engagement with a bale in said chamber; and means to periodically reduce force urging the pressure member into frictional engagement with the side of the previously tied bale to reduce frictional force between the previously tied bale and the pressure member to minimize friction force exerted on wire against which loose material is compacted to form a bale of predetermined volume.

7. The combination called for in claim 6 with the addition of: actuated means to energize said pressure actuated cylinder; and actuating means to actuate the actuated means.

8. The combination called for in claim 6 wherein the means to compress loose material in said inlet end of said chamber comprises: a plunger; means to reciprocally move said plunger in said inlet end of said chamber; and means to stop said plunger in said chamber.

9. In a baling apparatus having a chamber and a discharge end of the chamber: a pressure member; means moveably securing said pressure member adjacent one side of the discharge end of the chamber; pressure actuated means to urge said pressure member into frictional engagement with the side of a bale adjacent said discharge end of the chamber; a source of pressurized fluid; a solenoid actuated valve between said source of pressurized fluid and said pressure actuated means; and switch means arranged to be actuated by movement of a bale in the chamber such that said pressure member is moved to prevent movement of the bale upon movement of a bale to a predetermined position for tying and such that said pressure member is moved to a position to permit movement of the bale after tying is completed.

10. In a baling apparatus having walls arranged to form a chamber having an open discharge end; a pressure member; means moveably securing said pressure member adjacent one side of the discharge end of the chamber; pressure actuated means to move said pressure member between a first position substantially parallel to the wall of the chamber and a second position wherein the pressure member extends inwardly of the wall of the chamber into frictional engagement with the side of a bale adjacent the discharge end of the chamber; a source of pressurized fluid; valve means between said source of pressurized fluid and said pressure actuated means; and valve actuating means arranged to be actuated by movement of a bale in the chamber such that pressurized fluid is delivered to said pressure actuated means to move said pressure member to said second position to prevent movement of the bale upon movement of a bale to a predetermined position for tying and such that pressurized fluid is delivered to said pressure actuated means to move said pressure member to said first position to permit movement of the bale after tying is completed.

* * * * *